A. BILLS.
PORTABLE RECIPROCATING SAW MACHINE.
APPLICATION FILED FEB. 19, 1920
1,428,208. Patented Sept. 5, 1922.
Fig.1
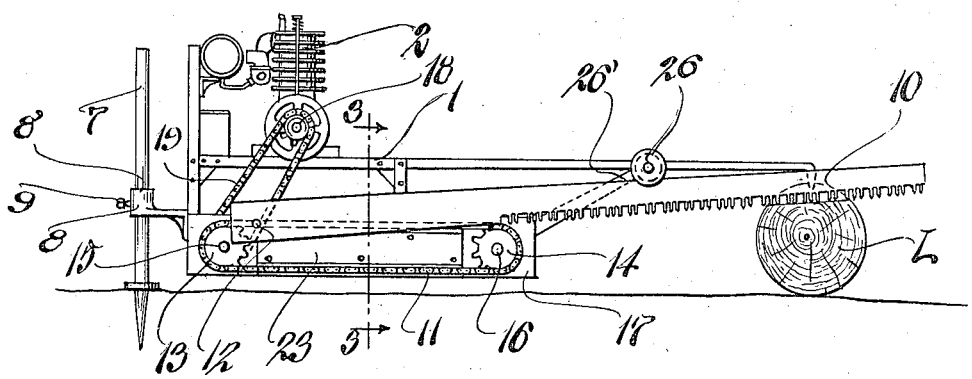
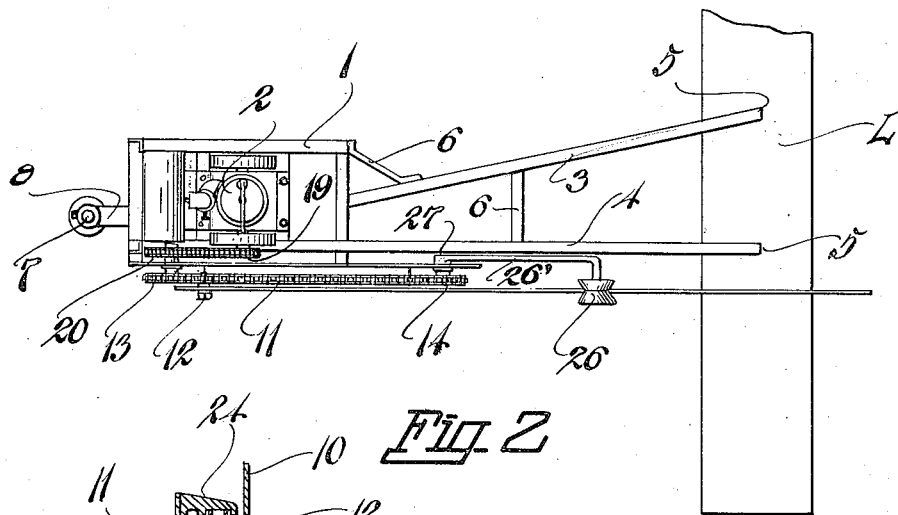
Fig.2
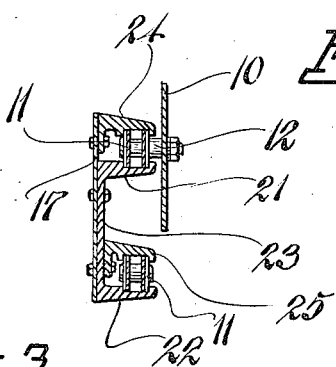
Fig.3
Inventor
Alexander Bills
By Herbert E. Smith
Attorney Patented Sept. 5, 1922.

1,428,208

UNITED STATES PATENT OFFICE.

ALEXANDER BILLS, OF HOMESTEAD, OREGON.

PORTABLE RECIPROCATING SAW MACHINE.

Application filed February 19, 1920. Serial No. 359,867.

*To all whom it may concern:*

Be it known that I, ALEXANDER BILLS, a citizen of the United States, residing at Homestead, in Baker County and State of Oregon, have invented certain new and useful Improvements in Portable Reciprocating Saw Machines, of which the following is a specification.

My present invention relates to improvements in portable reciprocating saw machines of the drag type consisting of a cross cut saw or buck saw, and its adjustable supporting frame, together with novel guiding means for the movement of the saw, and further consisting in certain novel combinations and arrangements of parts for transmitting power to the saw, as will be described hereinafter.

The primary object of the invention is the provision of a sawing machine designed especially for cutting cord wood, or for sawing felled trees or logs into convenient lengths, which is comparatively simple in construction, compact in arrangement, and efficient in performing the functions for which it is intended.

In the accompanying drawings I have illustrated one complete example of the physical embodiment of my invention, constructed and arranged according to the best mode I have so far devised for the practical application of the principles of my invention. And while the structure exemplified in the drawings is a complete disclosure of one form of my invention, it will be understood that colorable changes and alterations may be made within the scope of my claims without departing from the spirit of the invention.

Figure 1 is a view in side elevation showing a portable reciprocating saw machine embodying my invention, and in position for actual use, showing the saw as having cut a kerf in a log.

Figure 2 is a top plan view of the machine in Figure 1.

Figure 3 is an enlarged detail sectional view through the saw, its endless chain for transmitting motion thereto, and the guideways and supports for said chain.

In the preferred form of the invention as illustrated in the drawings I have illustrated the portable machine as comprising a rectangular frame 1 made up of suitable metallic members riveted or bolted together with suitable braces to provide a stable and rigid support for the operating parts of the machine including an internal combustion engine or gasoline motor 2 of well known type which is equipped with the necessary accessories.

The machine may be supported on the ground if convenient, or may be suspended at an adjustable altitude adapting it to various conditions of work, at three points of suspension, as by the elongated frame bars 3 and 4, preferably of metal and each fashioned with a downturned end formed with a spike or stud 5 to engage in the surface of the log L, to be sawed.

The elongated frame bar 4 projects perpendicularly from the main frame 1, but the bar 3 preferably diverges therefrom at an angle, so that the spiked ends are spaced apart, and suitable braces 6, 6, are provided to hold these horizontal bars rigidly in place, to support the machine at the free end of the saw.

In addition to these two points of suspension, a third point of suspension is provided for the support of the machine frame, by utilizing a stake 7, having the usual sharpened end to be driven into the ground, and which stands upright in order that the bracket 8, of metal, may be supported thereon. The bracket is firmly attached to the main frame 1, and its integral collar 8′ may slide vertically thereon, a set bolt 9 threaded in the collar being provided to securely hold the bracket and stake in rigid relation at the desired altitude.

The two spiked bars 3 and 4 thus form the support for the machine frame at one end, and it will readily be apparent that the frame may be elevated or lowered through its connection with the stake, and with the spikes 5 5 as a pivotal center, to adapt the machine to logs of different diameters, or to adapt the machine to irregularities in the surface of the ground.

The saw 10 is of the cross cut or buck saw type, with a free end, and adapted to be reciprocated to cut a kerf in the log as indicated in Figure 1, starting on the top of the log, and the reciprocation or back and forth movement of the saw is accomplished through the instrumentality of an endless drive chain 11 to which the saw is pivoted by means of a pin 12 carried at one of the link joints of the flexible chain. Thus two working strokes are given to the saw as the chain moves and the pin 12 travels outwardly toward the log and returns inwardly from the saw, the chain being suspended on the two sprocket wheels 13 and 14 on their respective shafts 15 and 16.

Of the two sprocket wheels 13 and 14, the former is the drive wheel for the chain and the latter an idler, and the shafts 15 and 16 of these wheels are supported or journaled in a metallic plate 17 firmly attached to and forming a part of the main frame 1 of the machine, and located at one side thereof, near the bottom of the frame. The longer shaft 15 is revolved directly from the motor 2 by the motor sprocket 18, the connecting sprocket chain 19, and a sprocket wheel, 20, on the shaft 15, located at the inner side of the shaft supporting plate 17, and when the saw is in operation, the power from the motor is continuously transmitted through this driving sprocket mechanism to the endless chain driving mechanism, and the reciprocating movement of the saw is accomplished through the travel of the endless chain to which the saw is pivotally connected. In this manner a comparatively long stroke is imparted to the saw, and it will be apparent that the length of the stroke may be governed by the distance between the two sprocket wheels 13 and 14 and the consequent length of the endless chain.

The upper and lower flights of the chain pass through and are guided in guide ways on the shaft plate 17 of the frame, such guide-ways being formed by the bracket arms 21 and 22 projecting horizontally from the bracket plate 23 attached to the shaft supporting plate 17, and forming lower supports for the upper and lower flights respectively of the chain. Upper guide means for the chain flights are provided by the guide plates 24 and 25 which co-act with the guide arms 21 and 22, and these several devices forming the guide means for the chain are disposed between the endless chain-supporting wheels 13 and 14, and provide open end slots for guiding and travel therethrough of the pin 12 of the saw. In this manner the pin is caused to travel in a true and straight path and consequently the motion of the saw is uniform and regular as the pin travels between the supporting wheels, the reversal of the saw stroke being accomplished as the pin travels around the sprocket wheels 13 and 14.

To hold the saw to its work and prevent wabbling, or buckling of the saw, a guide grooved pulley or sheave 26 is utilized to bear upon the back edge of the saw as in Figures 1 and 2, and this sheave is conveniently carried or journaled on the end of the saw guide arm 26, journaled at 27 on the shaft 16 of sprocket wheel 14 of the endless chain.

The construction and operation of the machine will readily be apparent from the previous description taken in connection with the drawings, and it will be obvious that the machine may be transported with facility and convenience from place to place during sawing operations, and provides a self-contained, compact, light but strong and durable appliance for its purpose.

What I claim and desire to secure by Letters Patent is—

1. The combination with the supporting structure of a positively driven endless chain, sprockets for said chain and shafts for said sprockets, a reciprocable saw pivoted at one end to said chain, a saw guide arm on one of said shafts and a guide sheave engaging the back of the saw and journaled on the free end of said guide arm.

2. The combination in a sawing machine with the main frame and supporting means therefor, of a shaft supporting plate and a pair of shafts journaled therein one of which is positively driven, sprocket wheels on said shafts and an endless chain on said wheels, a reciprocable saw pivoted to the chain and guide means for the saw, a pair of horizontal bracket arms fixed to said supporting plate between the wheels as under supports for the respective flights of the chain, and a pair of upper guide plate complementary to said arms for said chain flights, whereby slots are formed for guiding the pivotal connection between the saw and chain.

In testimony whereof I affix my signature.

ALEXANDER BILLS.